United States Patent [19]
Yamazaki et al.

[11] Patent Number: 5,791,309
[45] Date of Patent: Aug. 11, 1998

[54] BALANCER SHAFT SUPPORTING STRUCTURE IN ENGINE

[75] Inventors: Masakazu Yamazaki; Fuminori Kawashima; Shinji Yamada; Chiharu Shimizu, all of Wako, Japan

[73] Assignee: Honda Giken Kogyo Kabushiki Kaisha, Tokyo, Japan

[21] Appl. No.: 795,301

[22] Filed: Feb. 4, 1997

[30] Foreign Application Priority Data

Feb. 6, 1996 [JP] Japan .................... 8-020295
Feb. 6, 1996 [JP] Japan .................... 8-020296

[51] Int. Cl.$^6$ .................................. F02B 75/06
[52] U.S. Cl. .............................. 123/192.2; 74/603
[58] Field of Search ..................... 123/192.1, 192.2, 123/196 R, 198 C; 74/603

[56] References Cited

U.S. PATENT DOCUMENTS

| | | | |
|---|---|---|---|
| 4,440,123 | 4/1984 | Tsai | 123/192.2 |
| 4,509,474 | 4/1985 | Schmuck | 123/192.2 |
| 4,703,725 | 11/1987 | Weertman | 123/192 B |
| 4,766,857 | 8/1988 | Laine et al. | 123/192.2 |
| 5,044,333 | 9/1991 | Fuchigami et al. | 123/192.2 |
| 5,083,535 | 1/1992 | Deschler et al. | 123/192.2 |
| 5,535,643 | 7/1996 | Garza | 123/192.2 |

FOREIGN PATENT DOCUMENTS

| | | |
|---|---|---|
| 63-106443 | 5/1988 | Japan . |
| 6-017879 | 1/1994 | Japan . |

*Primary Examiner*—Erick R. Solis
*Attorney, Agent, or Firm*—Armstrong, Westerman, Hattori, McLeland & Naughton

[57] ABSTRACT

A secondary balancer device provided below a cylinder block of an engine including a front balancer shaft and a rear balancer shaft which are rotated in opposite directions and have longitudinally central main journal portions carried in a balancer holder, respectively. Bracing journal portions are provided on axial ends of one of the front and rear balancer shafts and supported in a pump body and a pump cover of an oil pump provided below the cylinder block, respectively. A pump shaft of the oil pump and the front balancer shaft are connected to a crankshaft by a common endless chain and rotated at different numbers of revolutions. Thus, the number of parts for supporting the balancer shafts can be reduced, while maintaining the freedom of setting the number of revolutions of the oil pump of the engine.

8 Claims, 16 Drawing Sheets

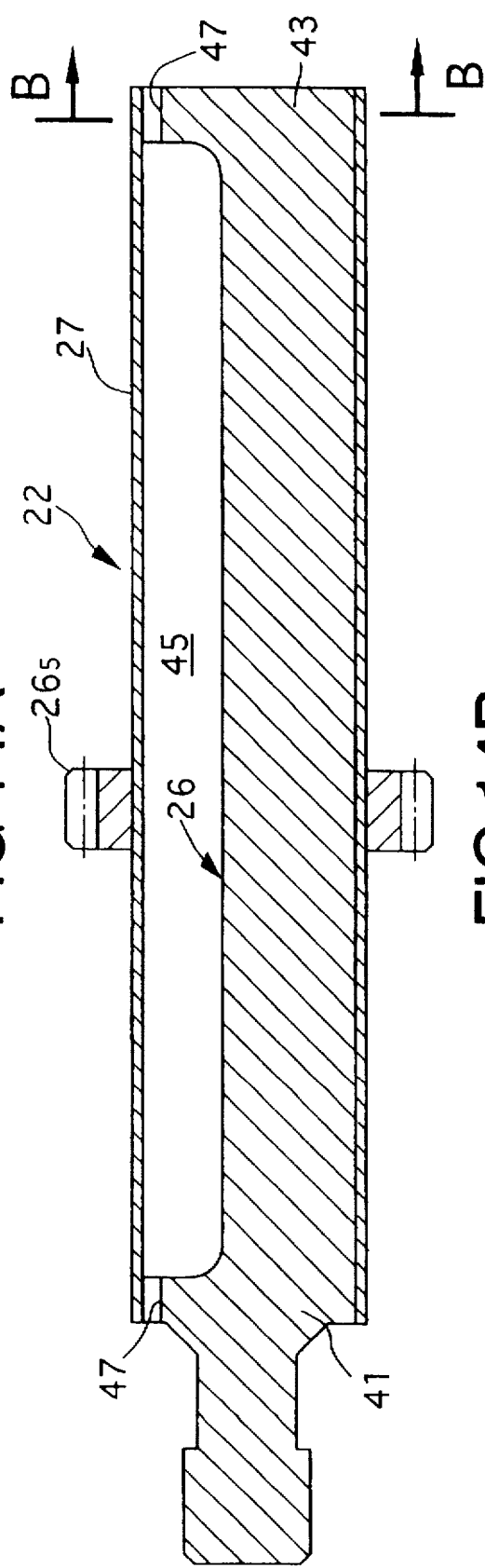
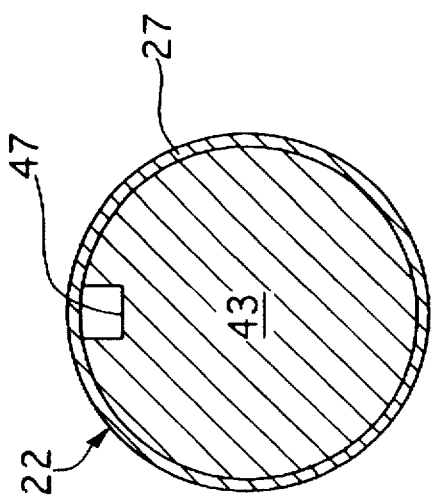
FIG. 14A
FIG. 14B

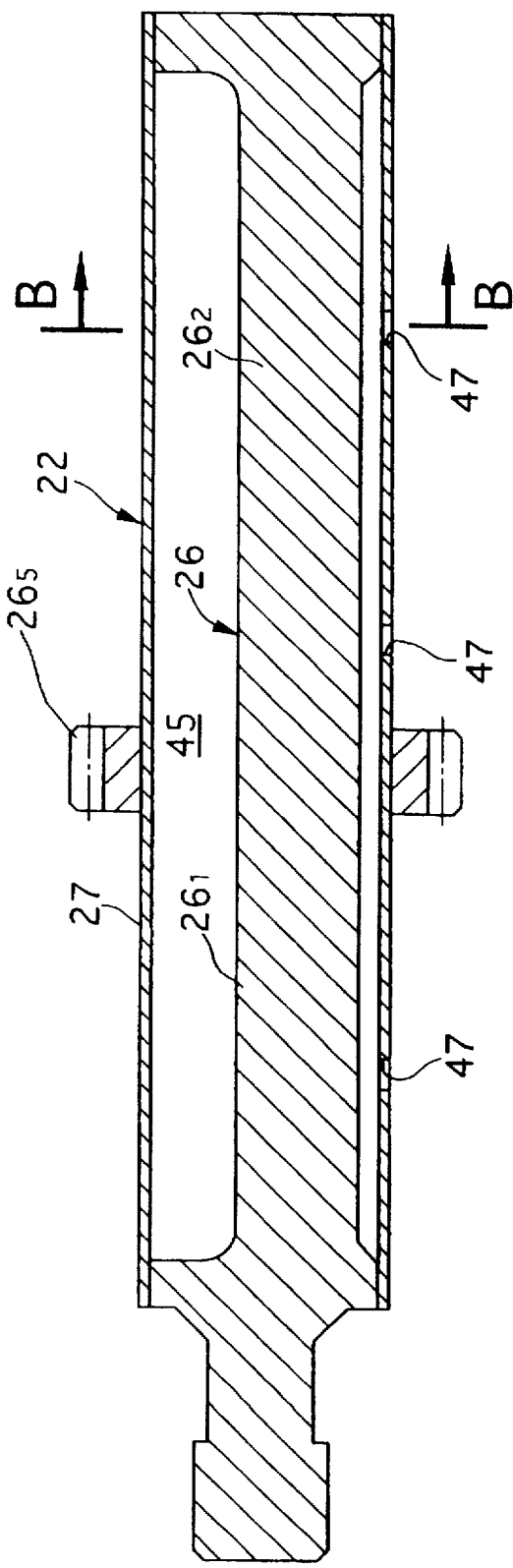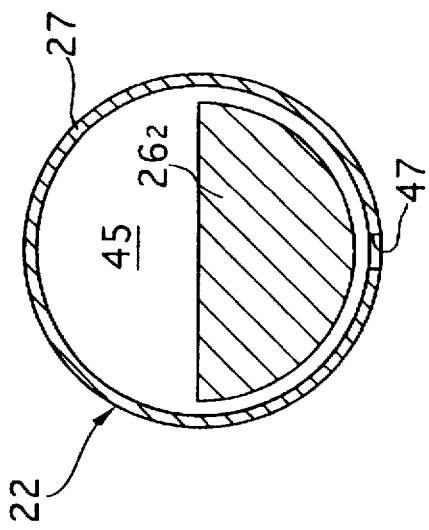

5,791,309

1

BALANCER SHAFT SUPPORTING STRUCTURE IN ENGINE

BACKGROUND OF THE INVENTION

1. Field of the Invention

The present invention relates to an engine including a balancer shaft disposed below a cylinder block, and more particularly, to a balancer shaft supporting structure.

2. Description of the Related Art

Japanese Patent Application Laid-open No. 63-106443 discloses a known design for an engine including a balancer shaft. This engine includes a casing fixed below the cylinder block, and a pair of balancer shafts interconnected by a pinion are supported in the casing. Thus, both of the balancer shafts are rotated in opposite directions at a speed twice that of the crankshaft by transmitting a driving force from the crankshaft to one of the balancer shafts.

The known engine suffers from a disadvantage in that because the opposite ends of each of the balancer shafts are supported by the casing which is divided into two members, respectively, it results in an increased number of parts. Therefore, it is conceived that the oil pump is disposed below the cylinder block; one of the balancer shafts is formed integrally with, or connected to the pump shaft, and the pump housing is utilized for supporting the one balancer shaft. However, such a construction suffers a problem that the size of the oil pump is increased, and the number of the connecting members is increased. Another problem is that the number of revolutions of the pump shaft and the number of revolutions of the balancer shaft must be set at the same value and for this reason, the design of the oil pump is limited.

SUMMARY OF THE INVENTION

Accordingly, it is an object of the present invention to reduce the number of parts for supporting the balancer shaft, while maintaining the freedom of setting of the speed of the oil pump without an increase in the size of the engine.

To achieve the above object, according to a first aspect and feature of the present invention, there is provided a balancer shaft supporting structure in an engine including a balancer shaft disposed below a cylinder block, the balancer shaft supporting structure comprising an oil pump disposed below the cylinder block, the balancer shaft and a pump shaft of the oil pump being independently driven and disposed substantially coaxially with each other in a separated manner, at least one end of the balancer shaft being supported by a pump housing of the oil pump.

With such an arrangement, the balancer shaft is supported in the pump housing which supports the pump shaft and therefore, a special support member for supporting the balancer shaft is not required, leading to a reduction in the number of parts. Moreover, since the balancer shaft and the pump shaft are disposed substantially coaxially with each other in the separated manner, the balancer shaft and the oil pump can be disposed below the cylinder block without an increase in the size of the engine and moreover, the freedom of setting of the speed of the oil pump can be assured.

The above and other objects, features and advantages of the invention will become apparent from the following description of the preferred embodiments taken in conjunction with the accompanying drawings.

BRIEF DESCRIPTION OF THE DRAWINGS

FIGS. 1 to 9 illustrate a first embodiment of the present invention, wherein

2

Figure 1:
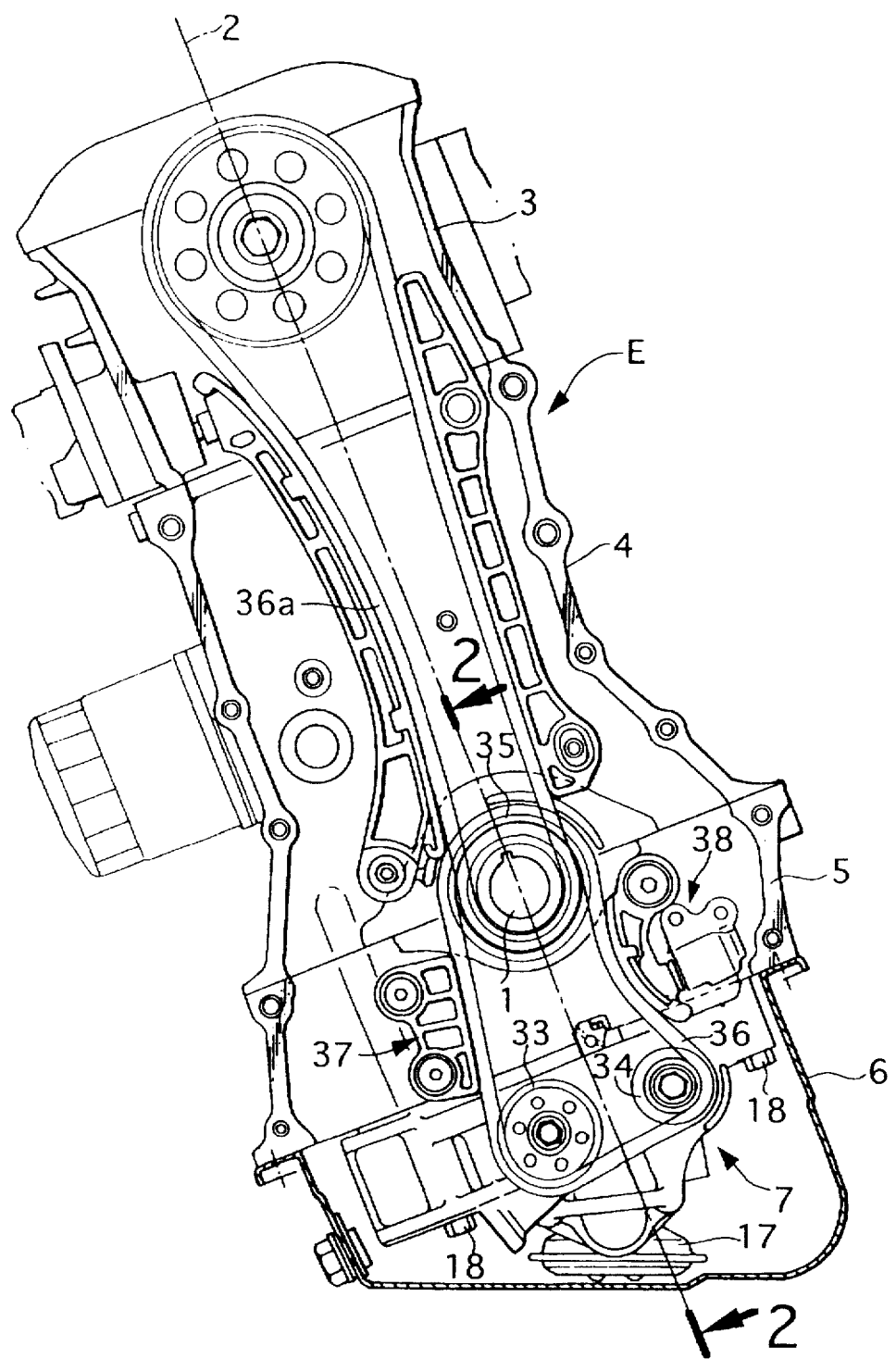
Figure 2:
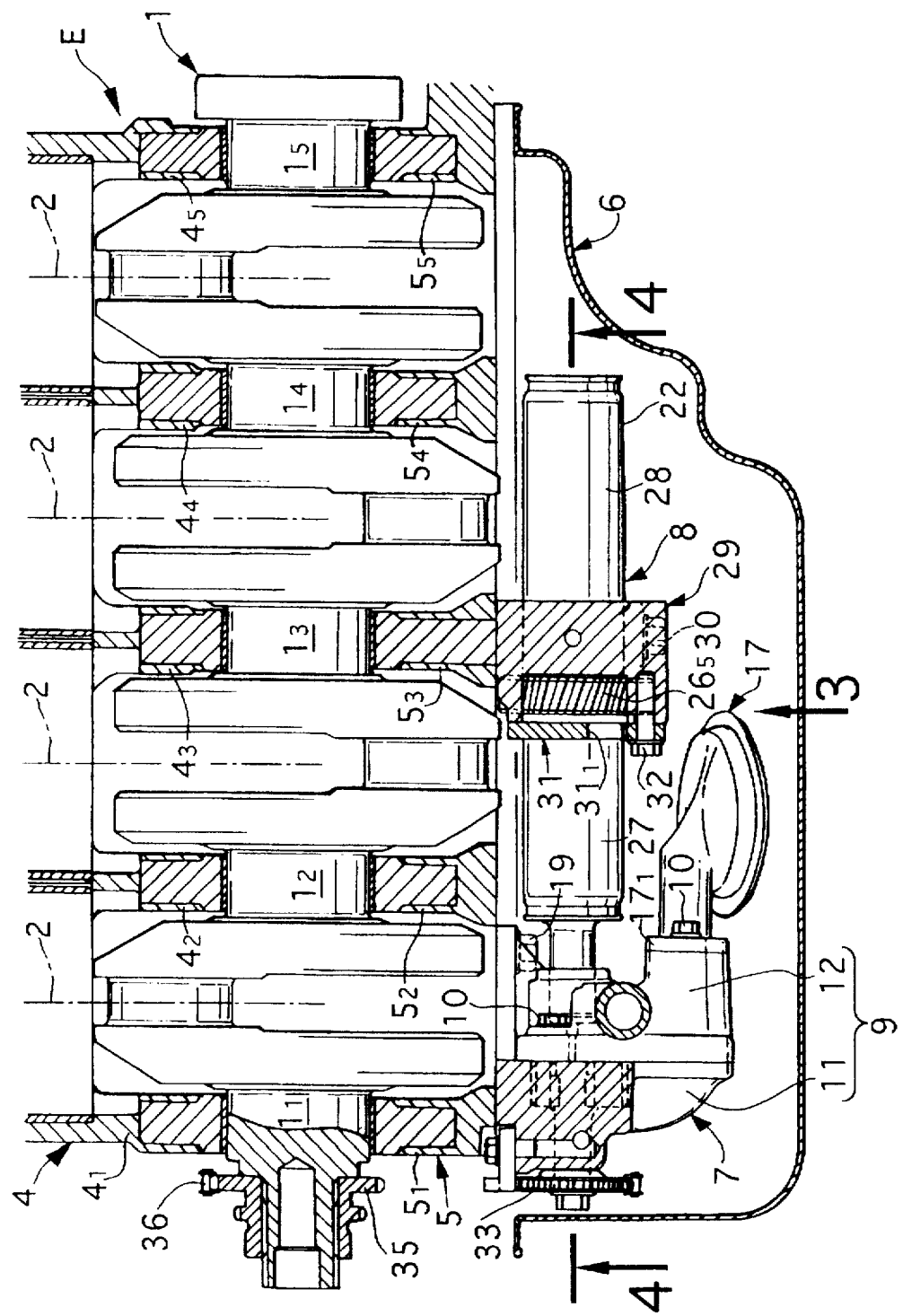
Figure 3:
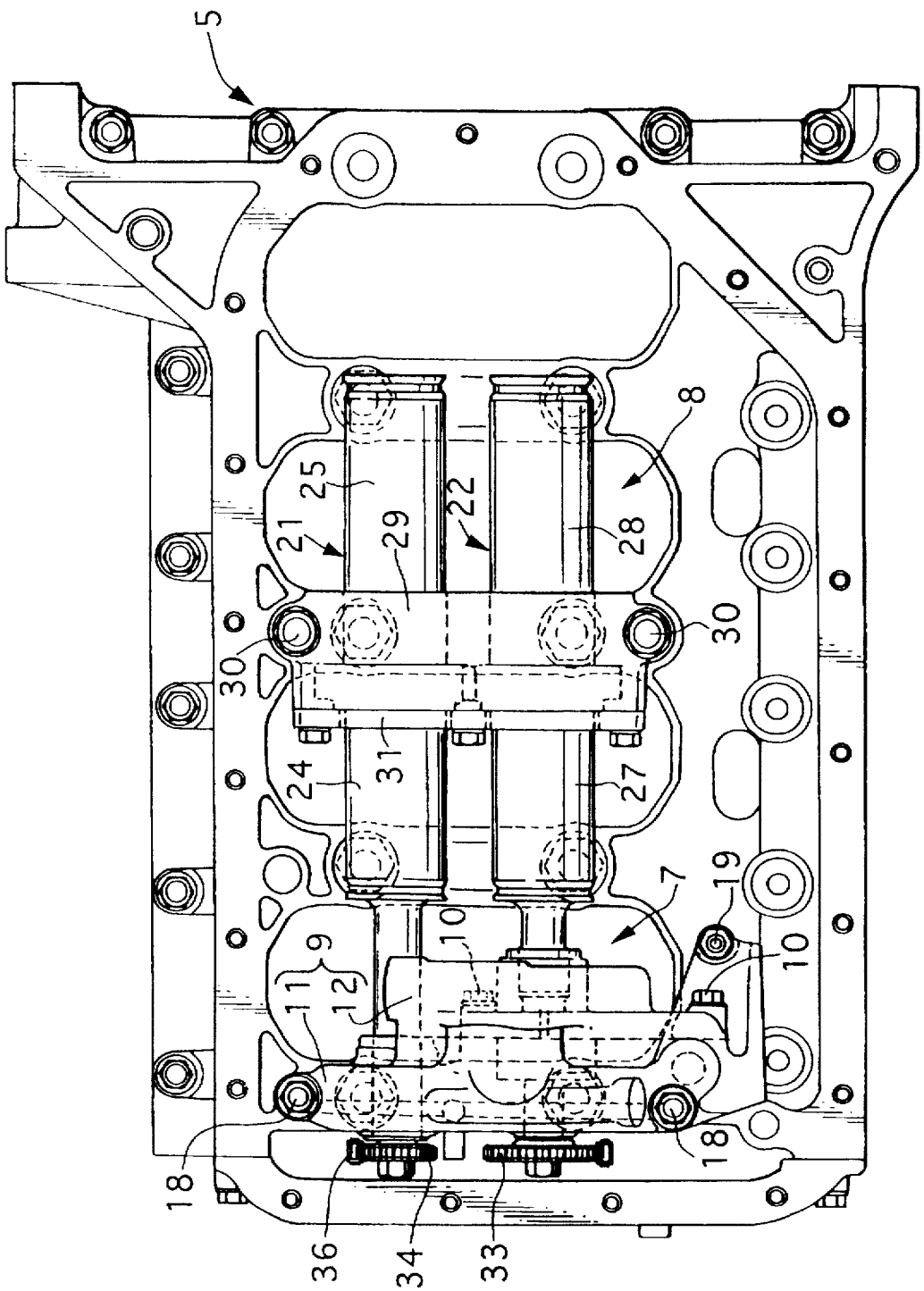
Figure 4:
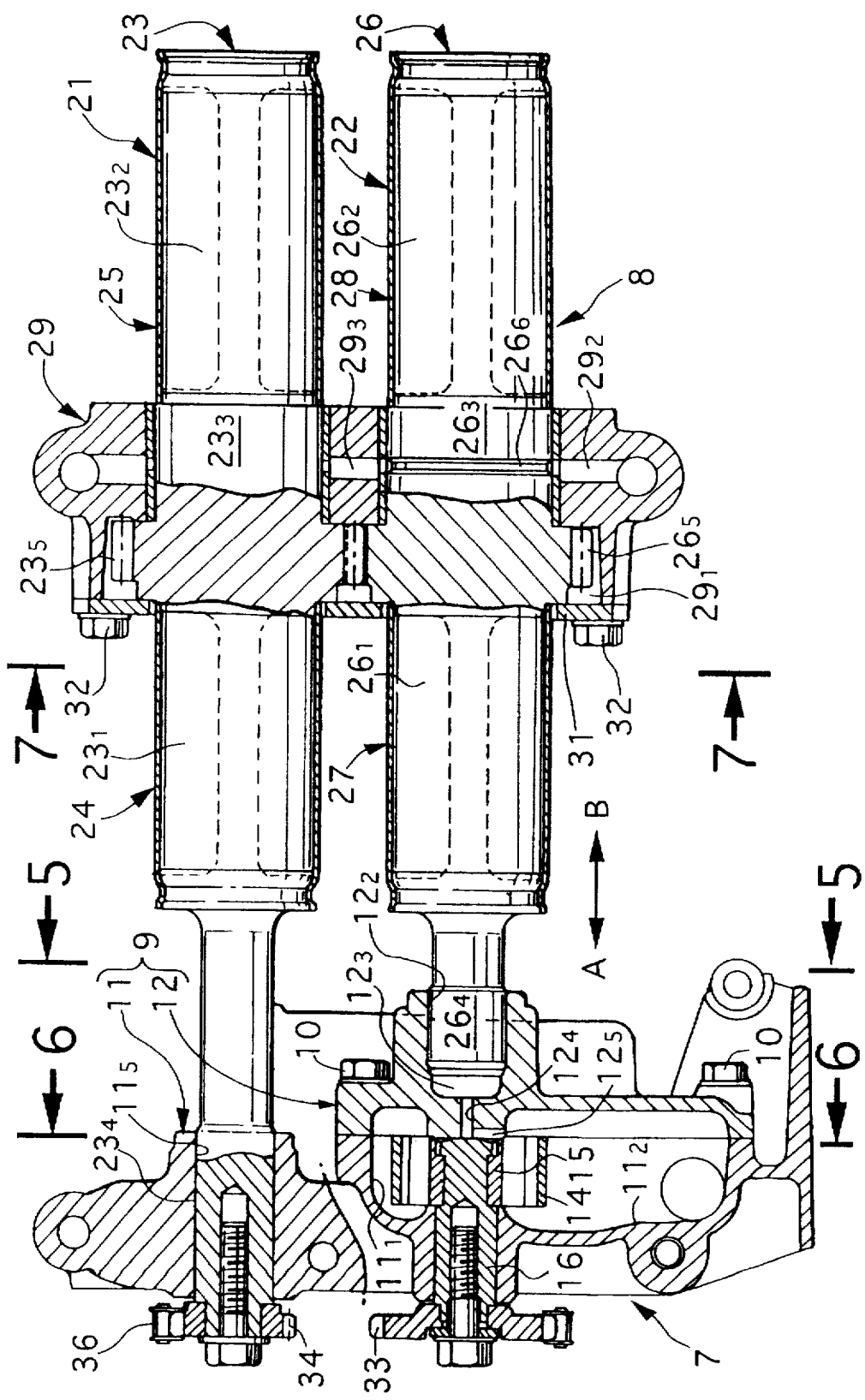
Figure 5:
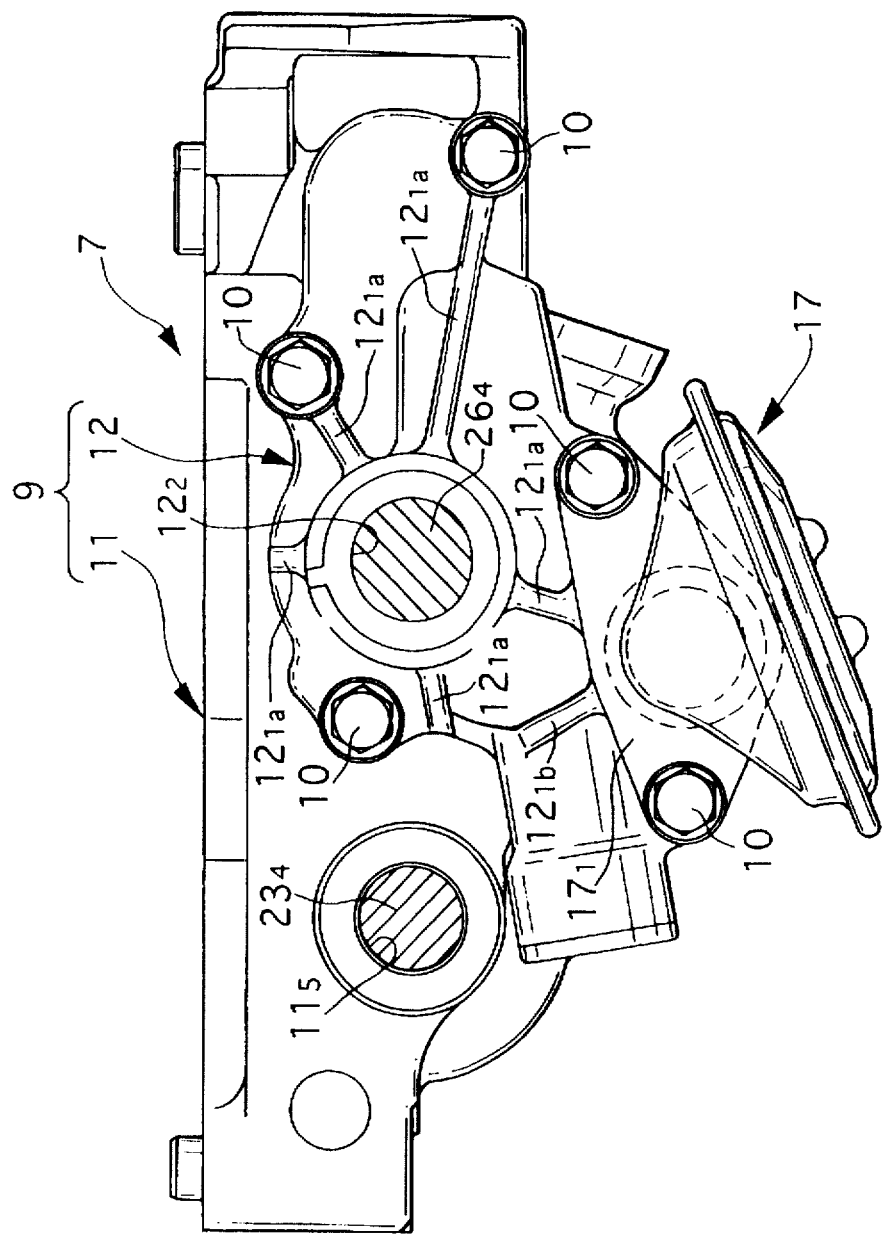
Figure 6:
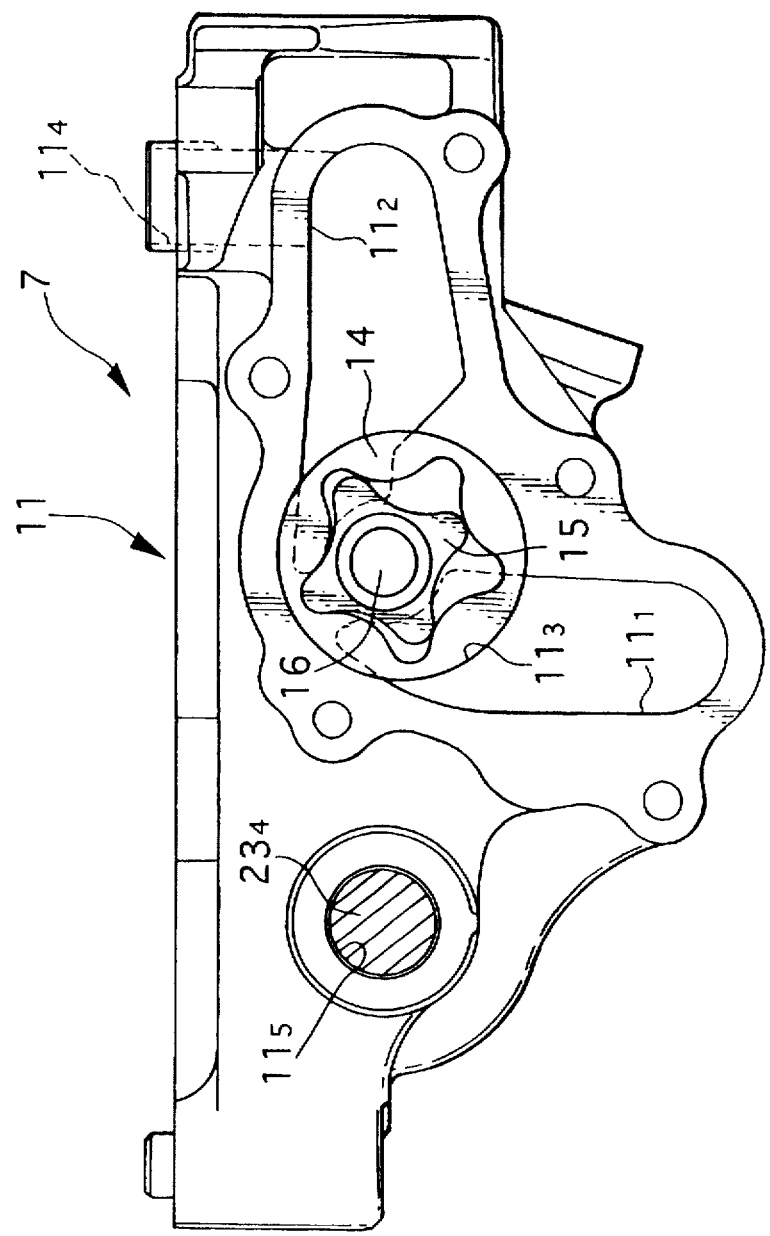
Figure 7:
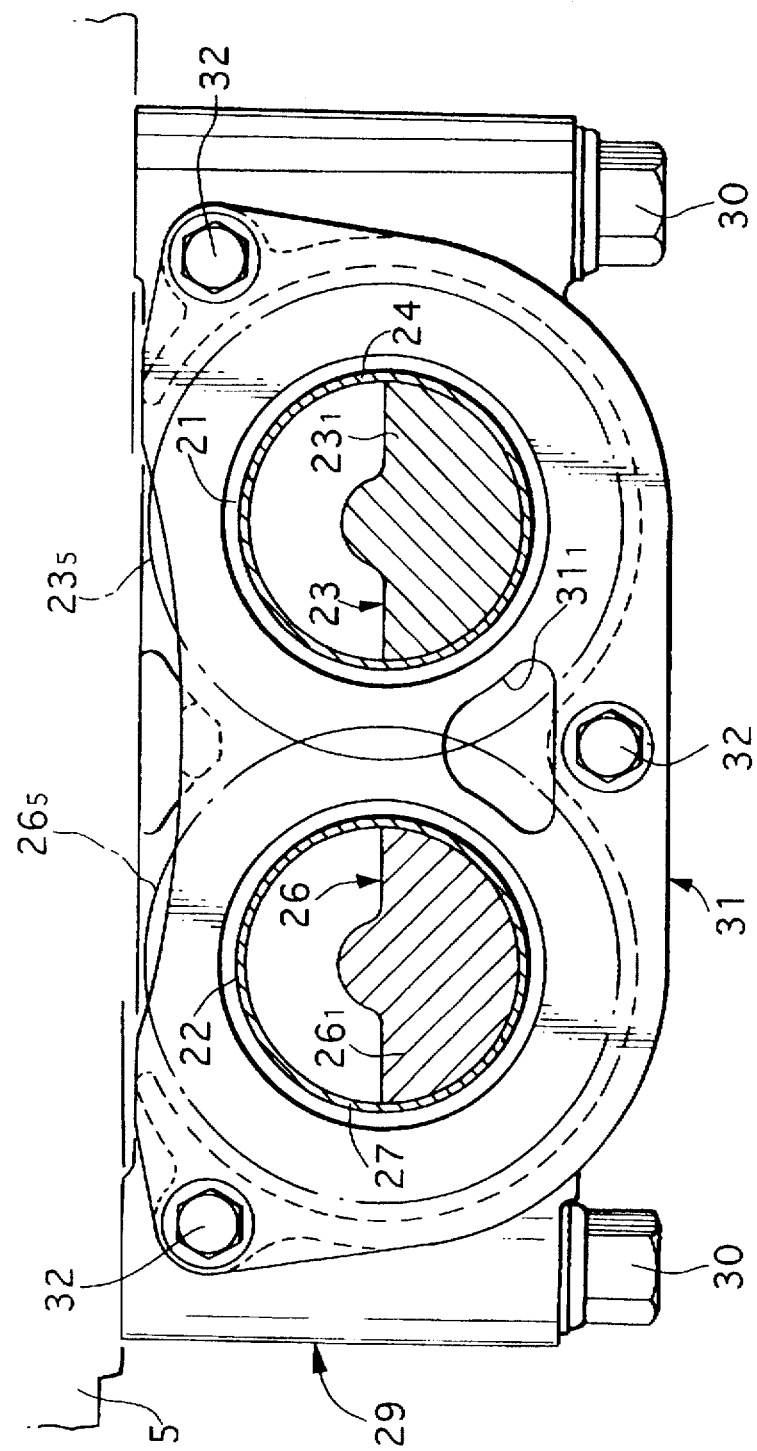
Figure 8:
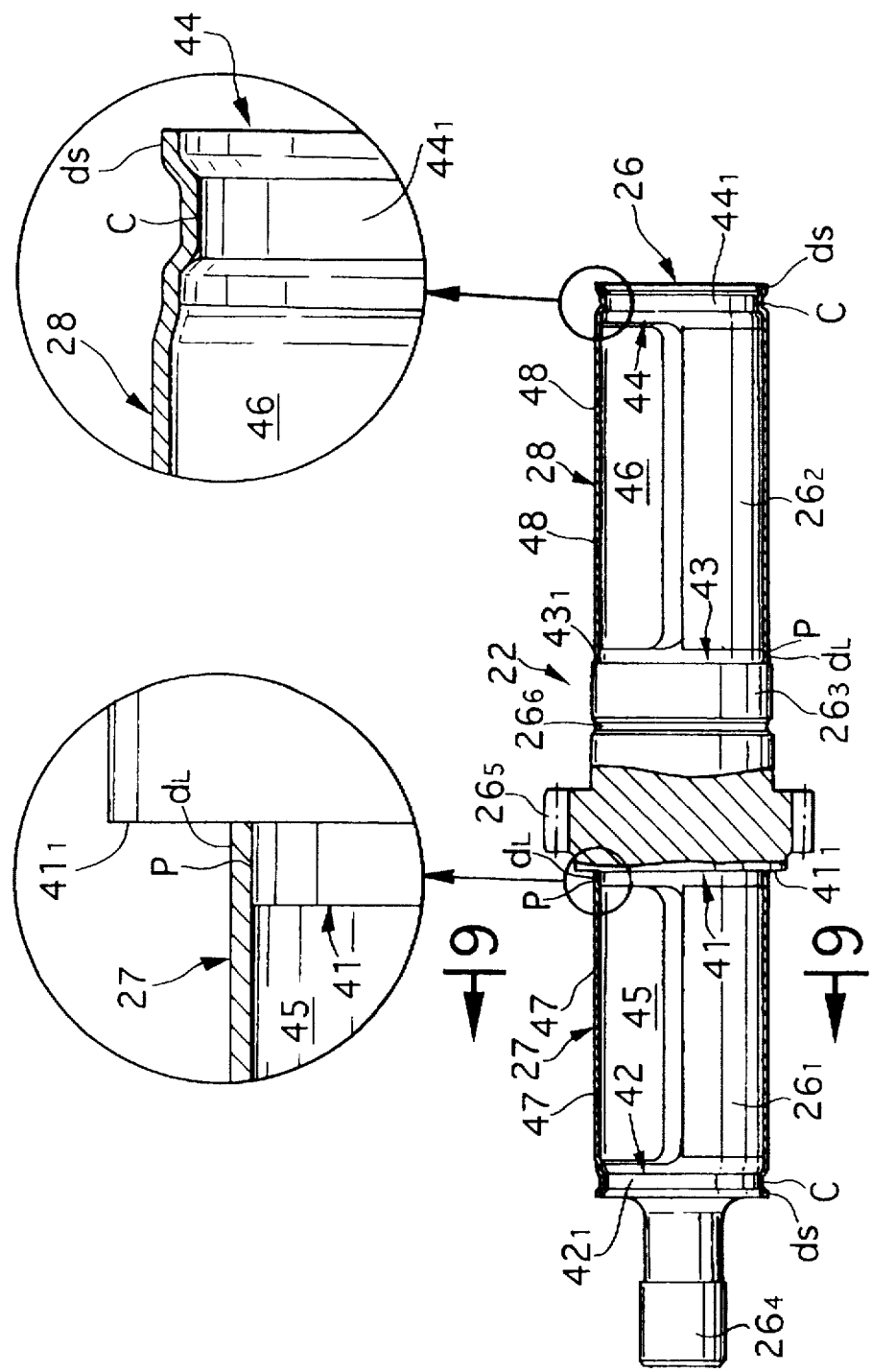
Figure 9:
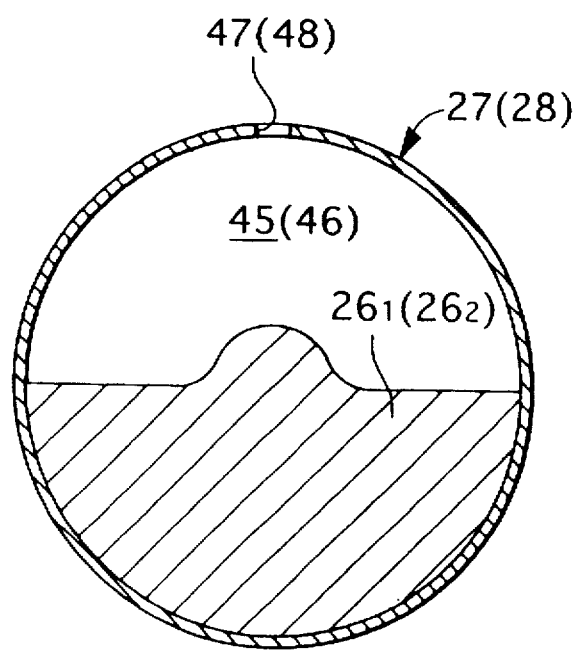
Figure 10:
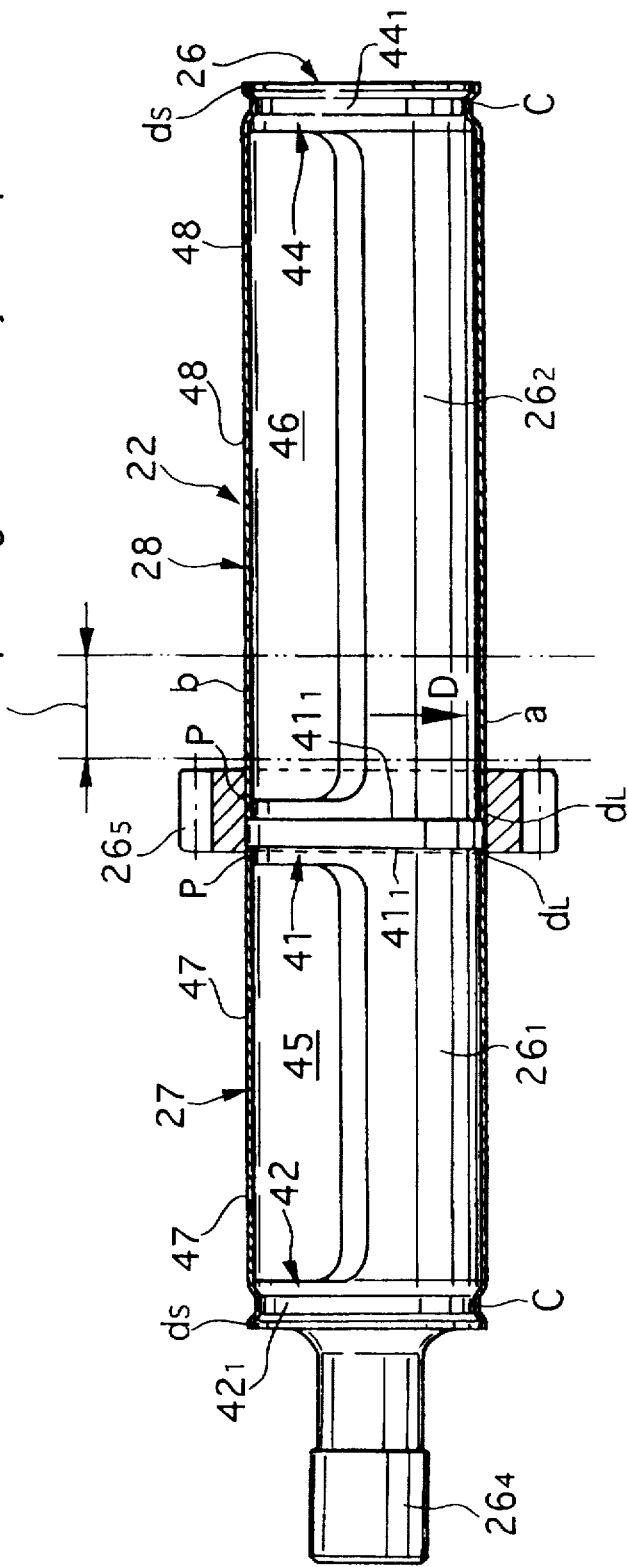
Figure 11:
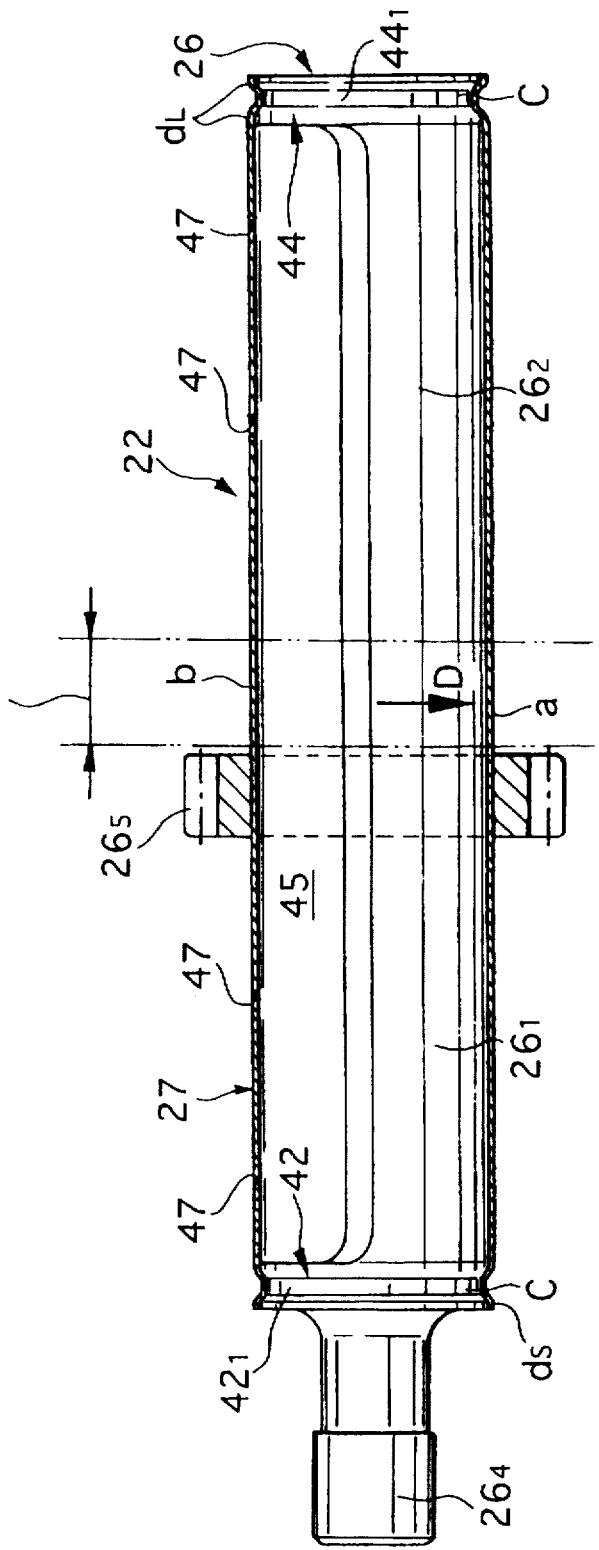
Figure 12:
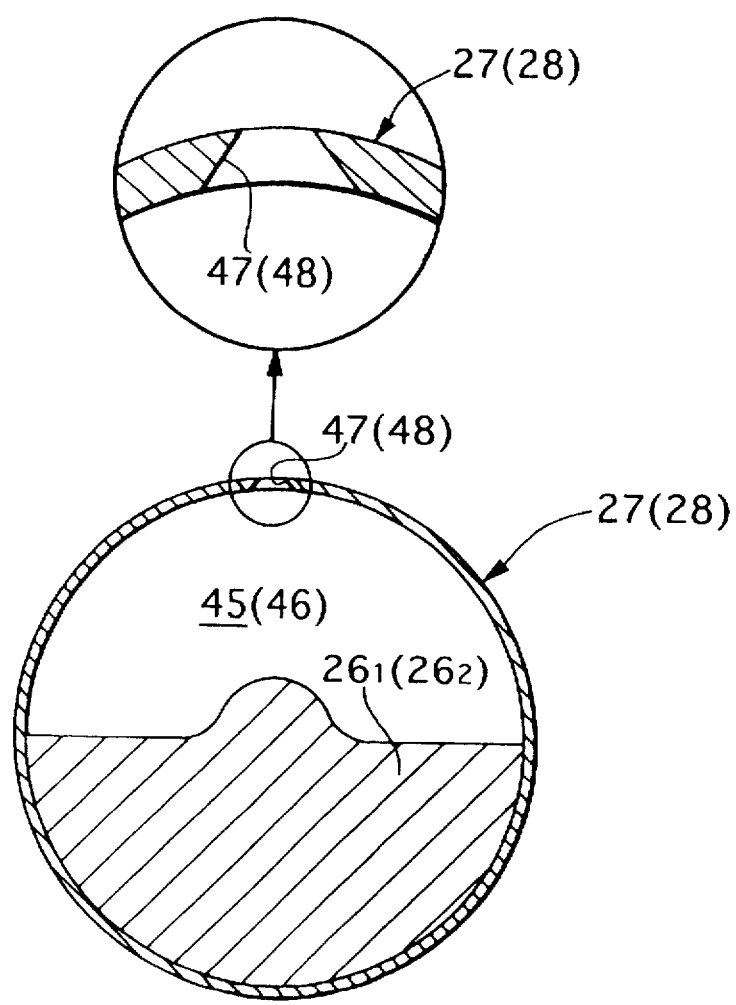
Figure 13:
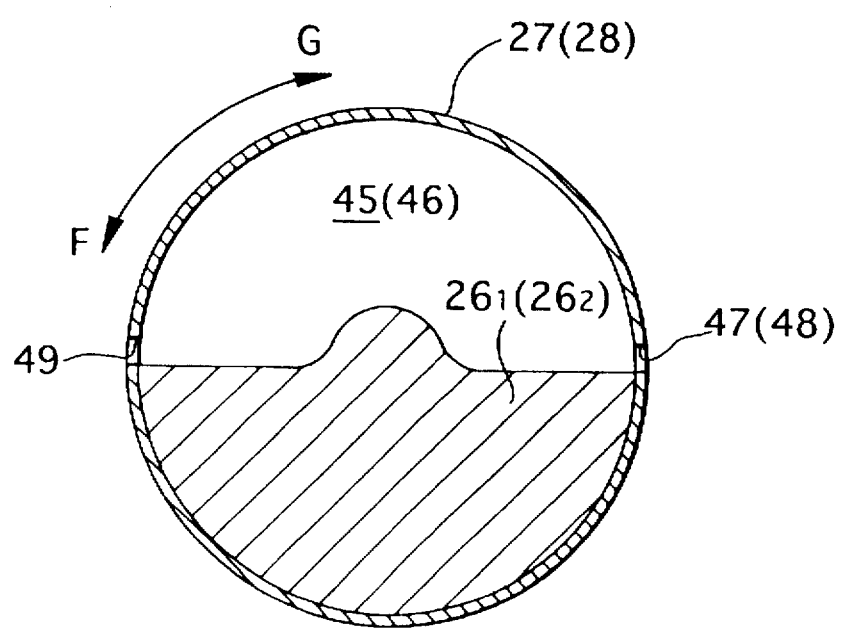
Figure 16A:
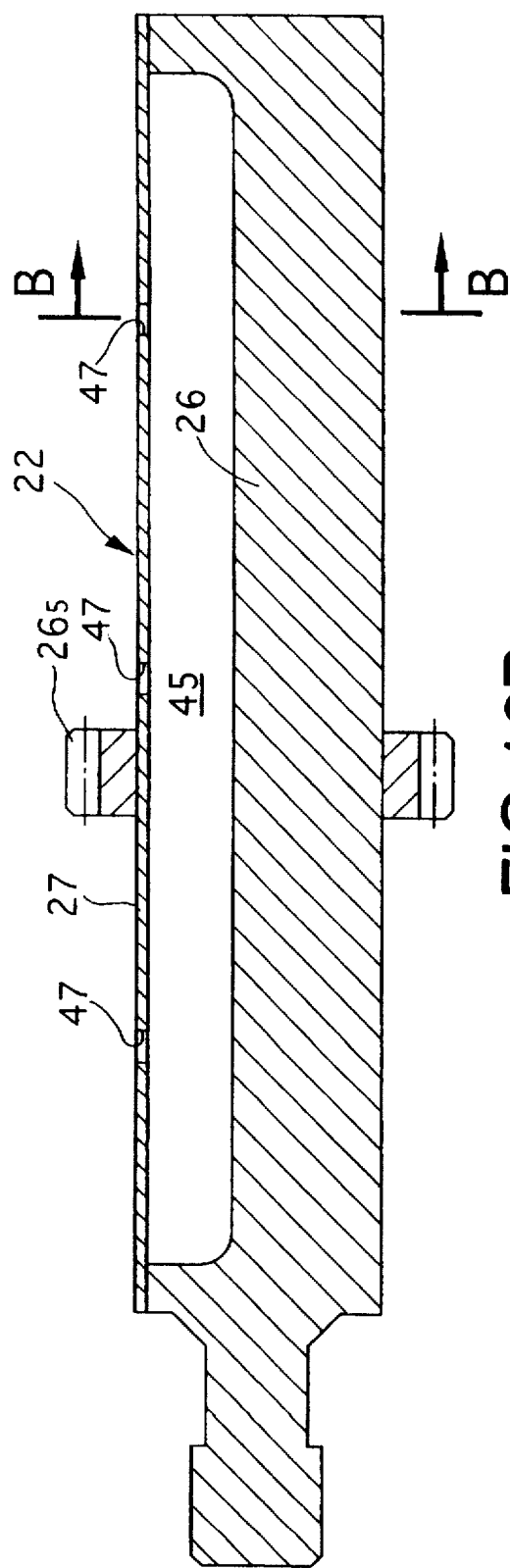
Figure 16B:
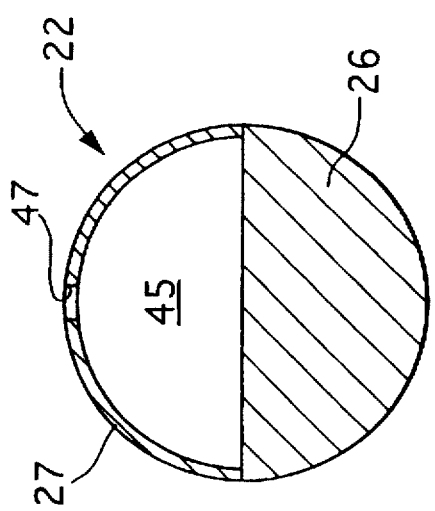

FIG. 1 is a vertical sectional view of an engine;

FIG. 2 is a sectional view taken along a line 2—2 in FIG. 1;

FIG. 3 is a view taken in a direction of an arrow 3 in FIG. 2;

FIG. 4 is an enlarged view (a bottom view of a secondary balancer device) taken along a line 4—4 in FIG. 2;

FIG. 5 is a view taken along a line 5—5 in FIG. 4;

FIG. 6 is a sectional view taken along a line 6—6 in FIG. 4;

FIG. 7 is an enlarged sectional view taken along a line 7—7 in FIG. 4;

FIG. 8 is a vertical sectional view of a rear balancer shaft;

FIG. 9 is an enlarged sectional view taken along a line 9—9 in FIG. 9;

FIG. 10 is a vertical sectional view of a rear balancer shaft according to a second embodiment of the present invention;

FIG. 11 is a vertical sectional view of a rear balancer shaft according to a third embodiment of the present invention;

FIG. 12 is a cross-sectional view of a rear balancer shaft according to a fourth embodiment of the present invention; and FIG. 13 is a cross-sectional view of a rear balancer shaft according to a fifth embodiment of the present invention;

FIGS. 14A and 14B are vertical and cross-sectional views of a rear balancer shaft according to a sixth embodiment of the present invention;

FIGS. 15A and 15B are vertical and cross-sectional view of a rear balancer shaft according to a seventh embodiment of the present invention; and FIGS. 16A and 16B are vertical and cross-sectional views of a rear balancer shaft according to an eight embodiment of the present invention.

DESCRIPTION OF THE PREFERRED EMBODIMENTS

A first embodiment of the present invention will first be described with reference to FIGS. 1 to 9.

Referring to FIGS. 1 to 3, an engine E in the present embodiment is an in-line 4-cylinder engine which has a crankshaft 1 disposed horizontally and four cylinder axes 2 disposed substantially vertically. An engine body includes a cylinder head 3, a cylinder block 4 coupled to a lower surface of the cylinder head 3, a lower block 5 coupled to a lower surface of the cylinder block 4, and an oil pan 6 coupled to a lower surface of the lower block 5. #1, #2, #3, #4 and #5 journal portions $1_1$, $1_2$, $1_3$, $1_4$ and $1_5$ of the crankshaft 1 are clamped and rotatably carried between five journal support portions $4_1$, $4_2$, $4_3$, $4_4$ and $4_5$ formed on the lower surface of the cylinder block 4 and five journal support portions $5_1$, $5_2$, $5_3$, $5_4$ and $5_5$ formed on an upper surface of the lower block 5.

The lower surface of the lower block 5 is provided with an oil pump 7 comprising a trochoidal pump and a secondary balancer device 8 for reducing the secondary vibration of the engine E. The oil pump 7 and the secondary balancer device 8 are immersed in oil accumulated in the oil pan 6. The oil pan 6 has a depth at a location below the #1 journal portion $1_1$ greater than that at a location below the #4 journal portion $1_4$, which is convenient for disposition of the oil pump 7.

As can be seen from FIGS. 4 to 6, a pump housing 9 of the oil pump 7 coupled to a lower surface of the journal portion $5_1$ of the lower block 5 comprises two members: a pump body 11 and a pump cover 12 which are integrally coupled to each other by five bolts 10. Six reinforcing ribs $12_{1a}$ and $12_{1b}$ project from a surface of the pump cover 12 opposite the pump body 11 (see FIG. 5). Not only the supporting rigidity of a rear balancer shaft 22, which will be described hereinafter, can be enhanced, but also a variation in oil level due to sloshing of the oil within the oil pan 6 can be suppressed, by the reinforcing ribs $12_{1a}$ and $12_{1b}$. Particularly, the supporting rigidity of the rear balancer shaft 22 can be remarkably enhanced by the five reinforcing ribs $12_{1a}$ formed to radiate on the journal portions of the rear balancer shaft 22.

The pump body 11 includes an intake port 11 which opens into a mating surface thereof to the pump cover 12, a discharge port $11_2$ and a pump chamber $11_3$. An inner rotor 15 meshed with an outer rotor 14 rotatably carried in the pump chamber $11_3$ is coupled to and driven by a pump shaft 16 rotatably carried in the pump body 11. The outer rotor 14, the inner rotor 15 and the pump shaft 16 are disposed substantially coaxially with the rear balancer shaft 22 and hence, the oil pump 7 can be made more compact, as compared with the case where rotors are mounted on two pump shafts, respectively, as in a circumscribed-type gear pump.

An oil strainer 17 is provided for filtering the oil within the oil pan 6 to supply the filtered oil to the intake port $11_1$ of the oil pump 7, and has a mounting flange $17_1$ which is fastened to the pump cover 12 by two of the five bolts 10 for coupling the pump cover 12 to the pump body 11. The oil discharged from the discharge port $11_2$ of the oil pump 7 is supplied through an oil passage $11_4$ to an oil gallery (not shown) defined in the cylinder block 4 and then supplied therefrom as a lubricating oil to various portions of the engine E.

Thus, the oil pump 7 having the above-described construction is coupled to the lower surface of the lower block 5 by two bolts 18, 18 passing through the pump body 11 below the #1 journal portion $1_1$, and by a single bolt 19 passing through the pump body 11 below between the #1 and #2 journal portions $1_1$ and $1_2$, i.e., at a location offset toward a bracing journal portion $26_4$.

The secondary balancer device 8 includes a front balancer shaft 21 and the rear balancer shaft 22 which are rotated in opposite directions at a speed twice the speed of the crankshaft 1. The front balancer shaft 21 is comprised of a shaft body 23 and a pair of cylindrical covers 24 and 25. The shaft body 23 includes a pair of balancer weight portions $23_1$ and $23_2$ eccentric from a rotational axis of the shaft body 23, a main journal portion $23_3$ formed between both the balancer weight portions $23_1$ and $23_2$, a bracing journal portion $23_4$ formed at one of axial ends, and driving helical gear $23_5$ formed adjacent the main journal portion $23_3$. The pair of cylindrical covers 24 and 25 are disposed coaxially with the rotational axis and fixed to the shaft body 23 to cover the pair of balancer weight portions $23_1$ and $23_2$.

The rear balancer shaft 22 is also comprised of a shaft body 26 and a pair of cylindrical covers 27 and 28, as is the front balancer shaft 21. The shaft body 26 includes a pair of balancer weight portions $26_1$ and $26_2$ eccentric from a rotational axis of the shaft body 23, a main journal portion $26_3$ formed between both the balancer weight portions $26_1$ and $26_2$, a bracing journal portion $26_4$ formed at one of axial ends, and follower helical gear $26_5$ formed adjacent the main journal portion $26_3$. The pair of cylindrical covers 27 and 28 are disposed coaxially with the rotational axis and fixed to the shaft body 26 to cover the pair of balancer weight portions $26_1$ and $26_2$.

By covering the balancer weight portions $23_1$, $23_2$; $26_1$ and $26_2$ with the cylindrical covers 24, 25; 27 and 28 in the above manner, the balancer weight portions $23_1$, $23_2$; $26_1$ and $26_2$ can be prevented from stirring the oil within the oil pan 6, thereby alleviating the rotational resistance of the front and rear balancer shafts 21 and 22.

As can be seen from FIG. 7, a balancer holder 29 made of an iron-based material is coupled to a lower surface of the journal supporting portion $5_3$ of the lower block 5 by two bolts 30, 30. The driving helical gear $23_5$ of the front balancer shaft 21 and the follower helical gear $26_5$ of the rear balancer shaft 22 are accommodated in a meshed relation within a gear chamber $29_1$ defined in a balancer holder 29. A thrust plate 31 for limiting the axial movement of the front and rear balancer shafts 21 and 22 is fixed to the balancer holder 29 by three bolts 32 to cover an opening in the gear chamber $29_1$. An oil escaping bore $31_1$ is defined in a central portion of the thrust plate 31, so that hydraulic pressure generated within the gear chamber $29_1$ by meshing of the driving helical gear $23_5$ with the follower helical gear $26_5$ escapes through the oil escaping bore 31.

The driving and follower gears $23_5$ and $26_5$ are provided between the main journal portions $23_3$ and $26_3$ of the bracing journal portions $23_4$ and $26_4$ of the balancer shafts 21 and 22 and in proximity to the main journal portions $23_3$ and $26_3$, respectively, providing a very good meshing accuracy. In addition, the thrust plate 31 is formed from a single member and hence, only a reduced number of parts need be required, and it is easy to attach the thrust plate 31. An oil escaping bore $31_1$ is provided at a location where the pressure in the gear chamber $29_1$ is higher, and below the gear chamber $29_1$, which is convenient for escaping of the oil. Further, because the balancer holder 29 is made of an iron-based material having a small thermal coefficient of expansion, the variation in distance between axes of the balancer shafts 21 and 22 can be minimized, thereby preventing the generation of an abnormal sound due to a failure of meshing of the helical gears $23_5$ and $26_5$.

As can be seen from FIG. 4, the bracing journal portion $23_4$ of the front balancer shaft 21 is supported in a bearing bore $11_5$ defined in the pump body 11, and the bracing journal portion $26_4$ of the rear balancer shaft 22 is supported in a bearing bore $12_2$ defined in the pump cover 12. The pump shaft 16 of the oil pump 7 and the rear balancer shaft 22 are disposed coaxially with each other, and an oil chamber $12_3$ is defined in the pump cover 12 to communicate with the axial end of the pump shaft 16 through an oil passage $12_4$, so that the axial end face $26_{41}$ (see FIG. 4) of the bracing journal portion $26_4$ of the rear balancer shaft 22 faces the oil chamber $12_3$.

In this way, each of the balancer shafts 21 and 22 is supported at two places: at the lengthwise central main journal portion $23_3$, $26_3$ and the bracing journal portion $23_4$, $26_4$, respectively and hence, the vibration of the balancer shafts 21 and 22 with the rotation can be reliably prevented. Moreover, since the bracing journal portion $26_4$ of the rear balancer shaft 22 is supported in the bearing bore $12_2$ of the pump cover 12, the length of the rear balancer shaft 22 is shortened and hence, the balancer shaft 22 can be supported in a further stable manner. Further, since the pump body 11 is coupled to the lower surface of the lower block 5 by the bolt 19 at the location offset toward the bracing journal portion $26_4$, leading to a remarkably enhanced supporting rigidity of the rear balancer shaft 22.

As can be seen from FIGS. 1 and 4, a pump follower sprocket 33 and a balancer follower sprocket 34 are fixed to the axial end of the pump shaft 16 extending from the pump body 11 and the axial end of the front balancer shaft 21, respectively, and are connected to a driving sprocket 35 fixed to the axial end of the crankshaft 1 through an endless chain 36. A chain guide 37 is provide on a tensioned side of the endless chain 36, and a chain tensioner 38 is provided on the other side of the endless chain 36.

The number of teeth of the balancer follower sprocket 34 is set at a value one-half of the number of teeth of the driving sprocket 35, and the number of teeth of the pump follower sprocket 33 is set so that it is different from the number of teeth of the balancer follower sprocket 34. It is preferable for the performance of the oil pump 7 that the number of teeth of the balancer follower sprocket 34 is less than that of the pump follower sprocket 33. The endless chain 36 for driving the oil pump 7 and the front balancer shaft 21 is disposed inside an endless chain for driving a camshaft, namely, on the side of the #1 journal portion $1_1$ of the crankshaft 1.

The structure of the rear balancer shaft 22 will be described below in further detail with reference to FIGS. 8 and 9.

A cylindrical cover press-fit support portion 41 having a circular section and a cylindrical cover caulking support portion 42 are formed at opposite ends of one of balancer weight portions $26_1$ of the shaft body 26, and likewise, a cylindrical cover press-fit support portion 43 having a circular section and a cylindrical cover caulking support portion 44 are formed at opposite ends of the other balancer weight portion $26_2$. A pair of the cylindrical cover press-fit support portions 41 and 43 are formed adjacent the follower helical gears $26_5$ and the main journal portion $26_3$, respectively, and a pair of the cylindrical cover caulking support portions 42 and 44 are formed at axial ends of the rear balancer shaft 22.

One end of the cylindrical cover 27 is press-fitted at P over an outer periphery of the cylindrical cover press-fit support portion 41 to abut against an end wall face $41_1$ of the follower helical gear $26_5$ and fixed thereto. The other end of the cylindrical cover 27 is fitted over an outer periphery of the cylindrical cover caulking support portion 42 and is fixed in a circumferential groove $42_1$ formed in the outer periphery of the cylindrical cover caulking support portion 42 by a rolling-caulking at C. Likewise, one end of the cylindrical cover 28 is press-fitted at P over an outer periphery of the cylindrical cover press-fit support portion 43 to abut against an end wall face $43_1$ of the follower helical gear $26_3$ and fixed thereto. The other end of the cylindrical cover 28 is fitted over an outer periphery of the cylindrical cover caulking support portion 44 and fixed in a circumferential groove $44_1$ formed in the outer periphery of the cylindrical cover caulking support portion 42 by a rolling-caulking at C.

Thus, half-split cylindrical spaces 45 and 46 are defined between the balancer weights $26_1$ and $26_2$ and the cylindrical covers 27 and 28. Two oil discharge bores 47, 47; 48, 48 are provided in each of the cylindrical covers 27 and 28 to permit the communication of the inside and outside of the spaces 45 and 46 with each other.

The structure of the front balancer shaft 21 is substantially the same as that of the above-described rear balancer shaft 22 and hence, the description thereof is omitted. As can be seen from FIGS. 4 and 8, an annular oil channel $26_6$ is defined in the main journal portion $26_3$ of the rear balancer shaft 22. The oil channel $26_6$ permits lubricating oil supplied from the oil passage $29_2$ in the balancer holder 29 to the main journal portion $26_3$ of the rear balancer shaft 22, to be guided via the oil passage $29_3$ to the main journal portion $23_3$ of the front balancer shaft 21.

The operation of the embodiment of the present invention having the above-described arrangement will be described below.

When the engine E is driven, the rotation of the crankshaft 1 is transmitted through the driving sprocket 35 and the endless chain 36 to the pump follower sprocket 33 and the balancer follower sprocket 34. Since the number of teeth of the balancer follower sprocket 34 is set at a value one-half that of the driving sprocket 35, the front balancer shaft 21 and the rear balancer shaft 22 connected to the front balancer shaft 21 through the driving helical gear $23_5$ and the follower helical gear $26_5$ having the same number of teeth are rotated in opposite directions at a rotational speed twice that of the crankshaft 1 to alleviate the secondary vibration of the engine E. In addition, since the number of teeth of the pump follower sprocket 33 is different from that of the balancer follower sprocket 34, the pump shaft 16 is rotated at a speed different from the speed of the balancer shafts 21 and 22 (e.g., at a speed one-half the speed of the balancer shafts 21 and 22).

In this way, the pump shaft 16 and the rear balancer shaft 22 disposed below the cylinder block 4 are disposed coaxially in a separated manner and are independently driven. Therefore, the size of the oil pump 7 cannot be increased and moreover, not only the oil pump 7 and the rear balancer shaft 22 can be disposed in a compact manner below the cylinder block 4, but also the speed of the oil pump 7 can be set a value unrelated to the speed of the rear balancer shaft 22 to permit freedom of design. The pump shaft 16 and the rear balancer shaft 22 are not necessarily disposed exactly coaxially with each other, but if the reduction in size and design freedom of the engine E are taken into consideration, it is desirable that the pump shaft 16 and the rear balancer shaft 22 are disposed coaxially with each other, as in the embodiment.

As can be seen from FIG. 4, an oil supply channel $12_5$ is defined in a surface of the pump cover 12 opposed to the pump shaft 16 and communicates at one end with the discharge port $11_2$ of the oil pump 7. The other end of the oil supply channel $12_5$ communicates with the axial oil passage $12_4$ defined in the pump cover 12 and hence, the oil supplied from the discharge port $11_2$ through the oil supply channel $12_5$ is supplied via the axial oil passage $12_4$ to the oil chamber $12_3$ to lubricate the bracing journal portion 26 of the rear balancer shaft 22 supporting the bearing bore $12_2$ connected to the oil chamber $12_3$. Because the oil passage $12_4$ is defined in the pump cover 12 in the above manner, the bracing journal portion 26 of the rear balancer shaft 22 can be lubricated using an oil passage having a minimum length.

The rear balancer shaft 22 is biased in a direction of arrow A in FIG. 4 by a reaction force received by the follower helical gear $26_5$ of the rear balancer shaft 22 from the driving helical gear $23_5$ of the front balancer shaft 21. However, the axial end of the bracing journal portion $26_4$ of the rear balancer shaft 22 is biased in a direction of arrow B by a hydraulic pressure applied to the oil chamber $12_3$ through the oil supply channel $12_5$ and the oil passage $12_4$ defined in the pump cover 12 and hence, the movement of the rear balancer shaft 22 in the thrust direction can be restrained to prevent the generation of an abnormal sound.

Now, the front and rear balancer shafts 21 and 22 are immersed in the oil in the oil pan 6 and hence, the oil may enter the spaces 45 and 46 in the balancer shafts 21 and 22 in some cases. There is a possibility that the amount of eccentricity of the position of the center of gravity of each of the balancer shafts 21 and 22 from the rotational axis is substantially reduced due to this entering of the oil to influence the balancer function. In the present embodiment, however, first ends of the cylindrical covers 24, 25, 27 and 28 are press-fitted over the cylindrical cover press-fit support portions 41 and 43 to abut against the end wall faces $41_1$ and $43_1$, and the other ends are rolled and caulked to the circumferential groove $42_1$ and $44_1$ of the cylindrical cover caulking support portions 42 and 44. Therefore, the sealability at these portions can be enhanced without use of a special seal member to suppress oil entering into the spaces 45 and 46 to the minimum.

In this case, since the first ends of the cylindrical covers 24, 25, 27 and 28 press-fitted over the cylindrical cover press-fit support portions 41 and 43 are larger-diameter portions $d_L$, and the other ends of the cylindrical covers 24, 25, 27 and 28 press-fitted over the cylindrical cover caulking support portions 42 and 44 are of smaller-diameter portions $d_S$ having diameters less than the larger-diameter portions $d_L$, both of the larger-diameter portions $d_L$ and the smaller-diameter portions $d_S$ are simultaneously press-fitted during assembling of the cylindrical covers 24, 25, 27 and 28 to enhance sealability. Moreover, since the larger-diameter portions $d_L$ are placed into abutment against the end wall faces $41_1$ and $43_1$ of the cylindrical cover press-fit support portions 41 and 43, the sealability is further enhanced.

Even if oil enters the spaces 45 and 46, rotation of the front and rear balancer shafts 21 and 22 are begun simultaneously, the oil within the spaces 45 and 46 is immediately discharged through the oil discharge bores 47 and 48 in the cylindrical covers 24, 25, 27 and 28 by the action of a centrifugal force, thereby reliably preventing a reduction in balancer function. Further, the oil discharge bores 47 and 48 are defined on the opposite side of the cylindrical covers 24, 25, 27 and 28 from the balancer weight portions $23_2$ and $26_2$ (on the side in which the balancer weight portions $23_2$ and $26_2$ are not provided) and hence, the structure for the oil discharge bores is simple. Moreover, this is convenient for reducing the weight of the balancer weight portions $23_2$ and $26_2$.

FIG. 10 illustrates a rear balancer shaft 22 according to a second embodiment of the present invention. A front balancer shaft 21 has substantially the same structure as the rear balancer shaft 22.

In the second embodiment, a shaft body 26 has a single cylindrical cover press-fit support portion 41. A pair of cylindrical covers 27 and 28 are press-fitted over opposite sides of the cylindrical cover press-fit support portion 41 to abut against end wall faces $41_1$, $41_1$, and a follower helical gear $26_5$ is fitted over and fixed to an outer periphery of the cylindrical cover press-fit support portion 41. The shaft body 26 has no solid main journal portion, and within the shaft body 26 at a location corresponding to the main journal portion, a half-periphery thereof corresponds to the balancer weight portion $26_2$, and the other half-periphery corresponds to the space 46. As in the first embodiment, each of the cylindrical covers 27 and 28 has a larger-diameter portion $d_L$ and a smaller-diameter portion $d_S$ at one end and at the other end, respectively. The larger-diameter portion $d_L$ is press-fitted over the cylindrical cover press-fit support portion 41 within the follower helical gear $26_5$ to abut against the end wall faces $41_1$, $41_1$.

In the second embodiment, the amount of eccentricity of the position of the center of gravity from the rotational axis can be increased to enhance the balancer function by assuring greater volumes of the spaces 45 and 46 within the rear balancer shaft 22. When the rear balancer shaft 22 is rotated, a load in a direction of arrow D is applied by a centrifugal force of the balancer weight portions $26_1$ and $26_2$, thereby causing the side a of the rear balancer shaft at the location corresponding to the main journal portion to be brought into sliding contact with the support surface of the balancer holder 29 to support such load. The side b of the rear balancer shaft at the location corresponding to the main journal portion is opposed to the space 46 and hence, has a lower load supporting strength. However, the load is not applied to such portion and hence, no problem in the strength arises. Moreover, an oil film can be retained between such portion and the balancer holder 29 to enhance the lubricating performance.

Furthermore, since the larger-diameter portion $d_L$ is press-fitted over the cylindrical cover press-fit support portion 41 within the follower helical gear $26_5$ to abut against the end wall faces $41_1$, $41_1$, not only the sealability can be largely enhanced, but also the axial dimension of the rear balancer shaft 22 can be shortened, as compared with that in the first embodiment. The structures of oil discharge bores 47 and 48 and a rolling caulking in the second embodiment are the same as in the first embodiment.

FIG. 11 illustrates a rear balancer shaft 22 according to a third embodiment of the present invention. A front balancer shaft 21 has substantially the same structure as the rear balancer shaft.

In the third embodiment, a shaft body 26 has a single balancer weight portion $26_1$, and a follower helical gear $26_5$ is fitted over and fixed to an outer periphery of a single cylindrical cover 27 which covers an outer periphery of the balancer weight portion $26_1$. The cylindrical cover 27 has a larger-diameter portion $d_L$ and a smaller-diameter portion $d_S$ at one end and at the other end, respectively. The larger-diameter portion $d_L$ is press-fitted over a cylindrical cover caulking support portion 44, and the smaller-diameter portion $d_S$ is press-fitted over a cylindrical cover caulking support portion 42.

In the third embodiment, the single cylindrical cover 27 need only be provided, leading to a reduction in the number of parts. Moreover, since the opposite ends of the cylindrical cover 27 can be rolled and caulked after being press-fitted, the entering of the oil into the space 45 can be further reliably prevented, but also maximizing of the volume of the space 45 can be assured to enhance the balancer function. As in the second embodiment, there is no interference with the load supporting strength at the position corresponding to the main journal portion and with the lubrication. The structures of oil discharge bores 47, 48 and a rolling caulking in the third embodiment are the same as in the first embodiment.

FIG. 12 illustrates a rear balancer shaft 22 (or a front balancer shaft 21) according to a fourth embodiment of the present invention. The fourth embodiment features a sectional area of each of oil discharge bores 47 and 48 which is reduced from the radially inner side toward the radially outer side. In the fourth embodiment, the discharging of oil from the spaces 45 and 46 can be further effectively performed.

FIG. 13 illustrates a rear balancer shaft 22 (or a front balancer shaft 21) according to a fifth embodiment of the present invention. The fifth embodiment includes an air introducing bore 49 in addition to oil discharge bores 47 and 48 permitting the communication between the inside and outside of the spaces 45 and 46. The oil discharge bores 47 and 48 are defined at retarded locations in a direction F of rotation of the rear balancer shaft 22, and the air introducing bore 49 is defined in an advanced location in the direction F of rotation of the rear balancer shaft 22. In the fifth embodiment, when the rear balancer shaft 22 begins rotation in the direction of arrow F, the oil within the spaces 45 and 46 is guided in a direction of arrow G along inner peripheral surfaces of the cylindrical covers 27 and 28 and is quickly discharged through the oil discharge bores 47 and 48. During this time, the discharging of the oil is further promoted by the introduction of air through the air introducing bore 49 into the spaces 45 and 46.

FIGS. 14A and 14B illustrate a rear balancer shaft 22 (or a front balancer shaft 21) according to a sixth embodiment of the present invention. In the sixth embodiment, oil discharge bores 47, 47 are defined in cylindrical cover press-fit support portions 41 and 43 at opposite ends of the shaft body 26 instead of being defined in the cylindrical cover 27. If the oil discharge bores 47, 47 are defined into a groove-like configuration, as shown in FIGS. 14A and 14B, the machining of them is made extremely easy.

FIGS. 15A and 15B illustrate a rear balancer shaft 22 (or a front balancer shaft 21) according to a seventh embodiment of the present invention. In the seventh embodiment, a clearance is defined between each of the balancer weight portions $26_1$ and $26_2$ of the shaft body 26 and the cylindrical cover 27 and communicates with the space 45, and oil discharge bores 47 are defined in the cylindrical cover 27 and communicate with the clearances. With such a construction, oil which is guided into the clearances between the balancer weight portions $26_1$ and $26_2$ of the shaft body 26 and the cylindrical cover 27 by a centrifugal force can be effectively discharged through the oil discharge bores 47.

FIGS. 16A and 16B illustrate a rear balancer shaft 22 (or a front balancer shaft 21) according to an eighth embodiment of the present invention. In the eight embodiment, a cover 27 fixed to the shaft body 26 is formed into a half-split cylindrical shape, and oil discharge bores 47 are defined in the cover 27. Even if the cover 27 is not completely cylindrical in the manner described above, an oil discharging function similar to that in each of the first to seventh embodiments can be exhibited.

Although the embodiments of the present invention have been described in detail, it will be understood that the present invention is not limited to the above-described embodiments, and various modifications may be made without departing from the spirit and scope of the invention defined in the claims.

For example, in each of the embodiments, the pump housing 9 is divided in to the pump body 11 and the pump cover 12, wherein the bracing journal portion $23_4$ of the front balancer shaft 21 is supported in the pump body 11, and the bracing journal portion $26_4$ of the rear balancer shaft 22 is supported in the pump cover 12. However, the pump housing 9 may be divided into any number of members, and the front balancer shaft 21 and/or the rear balancer shaft 22 may be supported in any of these members. The balancer shaft disposed substantially coaxially with the pump shaft may be supported in a cantilever manner in only the pump housing balancer holder 29, and the gear provided on the balancer shaft may be meshed directly with and driven by the gear provided on the crankshaft.

What is claimed is:

1. A balancer shaft supporting structure in an engine including a balancer shaft disposed below a cylinder block, said balancer shaft supporting structure comprising an oil pump disposed below the cylinder block, said balancer shaft and a pump shaft of said oil pump being driven independently and disposed substantially coaxially with each other in a separated manner, at least one end of said balancer shaft being supported by a pump housing of said oil pump.

2. A balancer shaft supporting structure in an engine according to claim 1, wherein said pump housing of said oil pump includes an oil passage defined therein for supplying oil from the oil pump directly to axial end faces of a journal portion of the balancer shaft supported in said pump housing of said oil pump.

3. A balancer shaft supporting structure in an engine according to claim 1, wherein an outer rotor, an inner rotor and said pump shaft of said oil pump are disposed substantially coaxially with said balancer shaft.

4. A balancer shaft supporting structure in an engine according to claim 1, wherein said pump housing comprises a pump body and a pump cover, rotors of said oil pump being accommodated in said pump body, said balancer shaft being supported in said pump cover.

5. A balancer shaft supporting structure in an engine according to claim 4, wherein said pump cover includes a fastened portion fastened to said pump body by a bolt, and a balancer shaft support portion for supporting said balancer shaft, said fastened portion and said balancer shaft support portion being connected to each other by a rib.

6. A balancer shaft supporting structure in an engine according to claim 4, wherein said pump cover includes a balancer shaft support portion for supporting said balancer shaft, and a rib formed thereon to extend radially from said balancer shaft support portion.

7. A balancer shaft supporting structure in an engine according to claim 1, wherein said balancer shaft having a substantially columnar contour is constructed by fixing a cover having at least a partially arcuate surface about a rotational axis to a balancer weight portion which is rotated eccentrically from the rotational axis within an oil pan, and an oil discharge passage is provided for permitting a space defined between said cover and said balancer weight portion to communicate with the outside, said oil discharge passage having an inner end formed near an outer peripheral portion of said balancer shaft.

8. A balancer shaft supporting structure in an engine according to claim 1, wherein said balancer shaft having a substantially columnar contour is constructed by fixing a cover having a cylindrical form about a rotational axis to a balancer weight portion which is rotated eccentrically from the rotational axis within an oil pan, said balancer weight portion having a cover support portion which is formed thereon and which has a circumferential groove, at least one end of said cover being fitted over said cover support portion and fixed by caulking in said circumferential groove.

* * * * *